US007277521B2

(12) United States Patent
Norman et al.

(10) Patent No.: US 7,277,521 B2
(45) Date of Patent: Oct. 2, 2007

(54) DETECTING SPECIAL NUCLEAR MATERIALS IN CONTAINERS USING HIGH-ENERGY GAMMA RAYS EMITTED BY FISSION PRODUCTS

(75) Inventors: Eric B. Norman, Oakland, CA (US); Stanley G. Prussin, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/821,658

(22) Filed: Apr. 8, 2004

(65) Prior Publication Data

US 2004/0258189 A1   Dec. 23, 2004

Related U.S. Application Data

(60) Provisional application No. 60/461,624, filed on Apr. 8, 2003.

(51) Int. Cl.
*G21G 1/00* (2006.01)
(52) U.S. Cl. .................. 376/156; 376/170; 376/257; 250/390.01; 250/363.01
(58) Field of Classification Search ................ 376/156, 376/158, 257, 154, 170; 250/370.01, 390.01, 250/363.01
See application file for complete search history.

(56) References Cited

U.S. PATENT DOCUMENTS 3,636,353 A * 1/1972 Untermyer ................. 376/194
3,767,919 A * 10/1973 Michaelis ................... 376/159
3,786,256 A * 1/1974 Untermyer .................. 376/159
3,796,875 A * 3/1974 Michaelis ............... 250/390.04
4,897,550 A * 1/1990 Bernard et al. ........ 250/390.01
4,902,467 A * 2/1990 Schoenig et al. ........... 376/159
5,378,895 A * 1/1995 Cole et al. ............. 250/390.04
5,784,424 A * 7/1998 Fries et al. .................. 376/189

OTHER PUBLICATIONS

Slaughter et al., "Detection of Special Nuclear Material in Cargo Containers Using Neutron Interrogation," Lawrence Livermore National Laboratory, UCRL-ID-155315, (No. IL 11319), p. 1-63, (Aug. 2003).
Slaughter et al., "The "Nuclear Car Wash": A Scanner to Detect Illicit Special Nuclear Material in Cargo Containers," IEEE Sensors Journal, Special Issue on Sensors for the Prevention of Terrorists Acts, UCRL-JRNL-202106, p. 1-8, (Jan. 30, 2004).

(Continued)

*Primary Examiner*—Ricardo J. Palabrica
(74) *Attorney, Agent, or Firm*—R'Sue P. Caron; Lawrence Berkeley; National Laboratory

(57) ABSTRACT

A method and a system for detecting the presence of special nuclear materials in a container. The system and its method include irradiating the container with an energetic beam, so as to induce a fission in the special nuclear materials, detecting the gamma rays that are emitted from the fission products formed by the fission, to produce a detector signal, comparing the detector signal with a threshold value to form a comparison, and detecting the presence of the special nuclear materials using the comparison.

6 Claims, 3 Drawing Sheets

OTHER PUBLICATIONS

Norman et al., "Signatures of Fissile Materials: High-energy y Rays Following Fission," Nuclear Instruments and Methods in Physics Research A, vol. 521, p. 608-610, (2004).

Alfassi, "Response to A Comment on "Signatures of Fissile Materials: High-energy y Rays Following Fission"," Nuclear Instruments and Methods in Physics Research A, vol. 534, p. 577, (2004).

Pruet et al., "Monte Carlo Models for the Production of B-delayed Gamma-rays Following Fission of Special Nuclear Materials," Nuclear Instruments and Methods in Physics Research B, vol. 222, p. 403-410, (2004).

Norman, "An Eclectic Journey Through Experimental Physics, or How I Learned to Stop Worrying and Love Nuclear Data," Lawrence Livermore National Laboratory, UCRL-PROC-208598 p. 14-18, (Dec. 14, 2004).

Slaughter et al., "Early Results Utilizing High-Energy Fission Product y Rays to Detect Fissionable Material in Cargo," Lawrence Livermore National Laboratory, vol. UCRL-JRNL-207073, p. 1-6, (Oct. 10, 2004).

Biever, "Improved X-ray Vision to Stop Nuke Smugglers," New Scientist.com News Service, (Oct. 20, 2005).

Strom et al., "Ionizing Radiation Imaging Technologies for Homeland Security," Health Physics Society, Proceedings of the 36th Midyear Topical Meeting, p. 79-87, (Jan. 26, 2003).

Gozani, "A Review of Neutron Based Non-Intrusive Inspection Techniques," Conference on Technology for Preventing Terrorism, Hoover Institution, Stanford University, p. 1-12, (Mar. 12, 2002).

* cited by examiner

DETECTING SPECIAL NUCLEAR MATERIALS IN CONTAINERS USING HIGH-ENERGY GAMMA RAYS EMITTED BY FISSION PRODUCTS

CROSS-REFERENCES TO RELATED APPLICATIONS

This application claims priority to U.S. Provisional Patent Application No. 60/461,624 filed Apr. 8, 2003, the disclosure of which is hereby incorporated by reference herein in its entirety for all purposes.

STATEMENT AS TO RIGHTS TO INVENTIONS MADE UNDER FEDERALLY SPONSORED RESEARCH OR DEVELOPMENT

A part of this invention was made with United States Government support from Contract No. DE-AC03-76SF00098 between the U.S. Department of Energy (DOE) and the Lawrence Berkeley National Laboratory. The United States has certain rights in this invention.

BACKGROUND OF THE INVENTION

The present invention relates in general to the detection of special nuclear materials ("SNM") in containers sea-going or intermodal. In particular, the present invention uses high-energy gamma rays emitted from fission products or fragments to identify SNM (i.e., $^{235}$U and $^{239}$Pu) in cargo containers and other potential sites. Special nuclear material (SNM) is defined by Title I of the Atomic Energy Act of 1954 as plutonium, uranium-233, or uranium enriched in the isotopes uranium-233 or uranium-235. The definition includes any other material which the Nuclear Regulatory Commission determines to be special nuclear material, but does not include source material. The Nuclear Regulatory Commission ("NRC") has not declared any other material as SNM. SNM is only mildly radioactive, but it includes some fissile material, uranium-233, uranium-235, and plutonium-239, that, in concentrated form, can be the primary ingredients of nuclear explosives. These materials, in quantities greater than formula quantities, are defined as "strategic special nuclear material" (SSNM). The uranium-235 content of low-enriched uranium can be concentrated (i.e., enriched) to make highly enriched uranium, the primary ingredient of a nuclear weapon.

Since Sep. 11, 2001, an increased urgency has been associated with the development of new and improved means for the detection and prevention of the clandestine transport of nuclear weapons materials and other materials for producing weapons of mass destruction. A particularly difficult problem is posed by highly-enriched uranium (e.g., $^{235}$U and plutonium (e.g., $^{239}$Pu) that might be hidden in large sea-going cargo containers, which may be filled with masses approaching 27 MT and which might represent areal densities of more than 50 g cm$^{-2}$ through which an identifying signal must penetrate to reach a detector. Passive detection methods (e.g., see "*Passive Nondestructive Assay of Nuclear Materials*," edited by D. Reilly, N. Ensslin, and H. Smith, Jr., *NUREG/CR*-5550, *LA-UR*-90-732 (1991)) based on measurements of neutrons and/or photons are either inapplicable or impractical in many such cases. Traditional methods of radiography are unlikely to provide a unique signature of highly-enriched $^{235}$U and $^{239}$Pu. Active interrogation with neutrons or high-energy photons in a variety of forms (e.g., see "*Ionizing Radiation Imaging Technologies for Homeland Security*," D. J. Strom and J. Callerame, *Proceedings of the 36$^{th}$ Midyear Topical Meeting, Health Physics Society*, Jan. 26-29, 2003, San Antonio, Tex., and "*A Review of Neutron Based Non-Intrusive Inspection Technologies*," T. Gozani, *Conference on Technology for Preventing Terrorism*, Hoover Institution, Mar. 12-13, 2002, Stanford University, Stanford, Calif.) currently depends upon the observation of β-delayed neutrons following induced fission to provide a unique signature for $^{235}$U and $^{239}$Pu. However, the shielding provided by a thick hydrogenous cargo can be so large that this method will fail or will have very low detection sensitivity.

In addition, considering that millions of cargo and other containers enter the United States each year, and considering that SNM might be hidden in some of these containers, in order to prevent the entry of any hidden SNM into the United States, a detection method needs to be effective without having to open and unload the containers. Furthermore, not only does a detection system need to be non-invasive, it must be able to perform its detection function in as short a time as possible, so as to not overly burden the flow of goods into the U.S. via these containers.

There is therefore a need for a system and a method of detecting special nuclear materials ("SNM") in containers that does not suffer from the above described shortcomings.

BRIEF SUMMARY OF THE INVENTION

The present invention is directed to methods and systems that use either neutrons or high-energy photons (e.g., gamma-rays) to irradiate a fully loaded cargo or other container. Such neutrons or gamma-rays have a sufficient flux and energy level to induce fission in any SNM inside the container. After the neutron or photon irradiation is completed, a detector, or an array or arrays of detectors are used to interrogate the container for high energy (e.g., above 2-2.5 or 3-4 MeV or higher) gamma rays that are produced by radioactive decays of fission products.

In one embodiment, the present invention is directed to a method of detecting the presence of special nuclear materials in a container. The method includes irradiating the container with an energetic beam, so as to induce a fission in the special nuclear materials; detecting the gamma rays that are emitted from the fission products formed by the fission, to produce a detector signal; comparing the detector signal with a threshold value to form a comparison; and detecting the presence of the special nuclear materials using the comparison.

In another embodiment, the present invention is directed to a system for detecting the presence of special nuclear materials in a container. The system includes an energetic beam source configured for irradiating the container, so as to induce a fission in the special nuclear materials; a detector configured for detecting the gamma rays that are emitted from the fission products formed by the fission, to produce a detector signal; a comparator for comparing the detector signal with a threshold value to form a comparison; and a presence detector for detecting the presence of the special nuclear materials using the comparison.

For a further understanding of the nature and advantages of the invention, reference should be made to the following description taken in conjunction with the accompanying drawings.

BRIEF DESCRIPTION OF THE DRAWINGS

FIG. 2A is a graph of background-corrected decay curves for gamma rays in the energy intervals 3000-4000 keV and 4000-8000 keV observed from the $^{239}$Pu target.

DETAILED DESCRIPTION OF THE INVENTION

Figure 1:
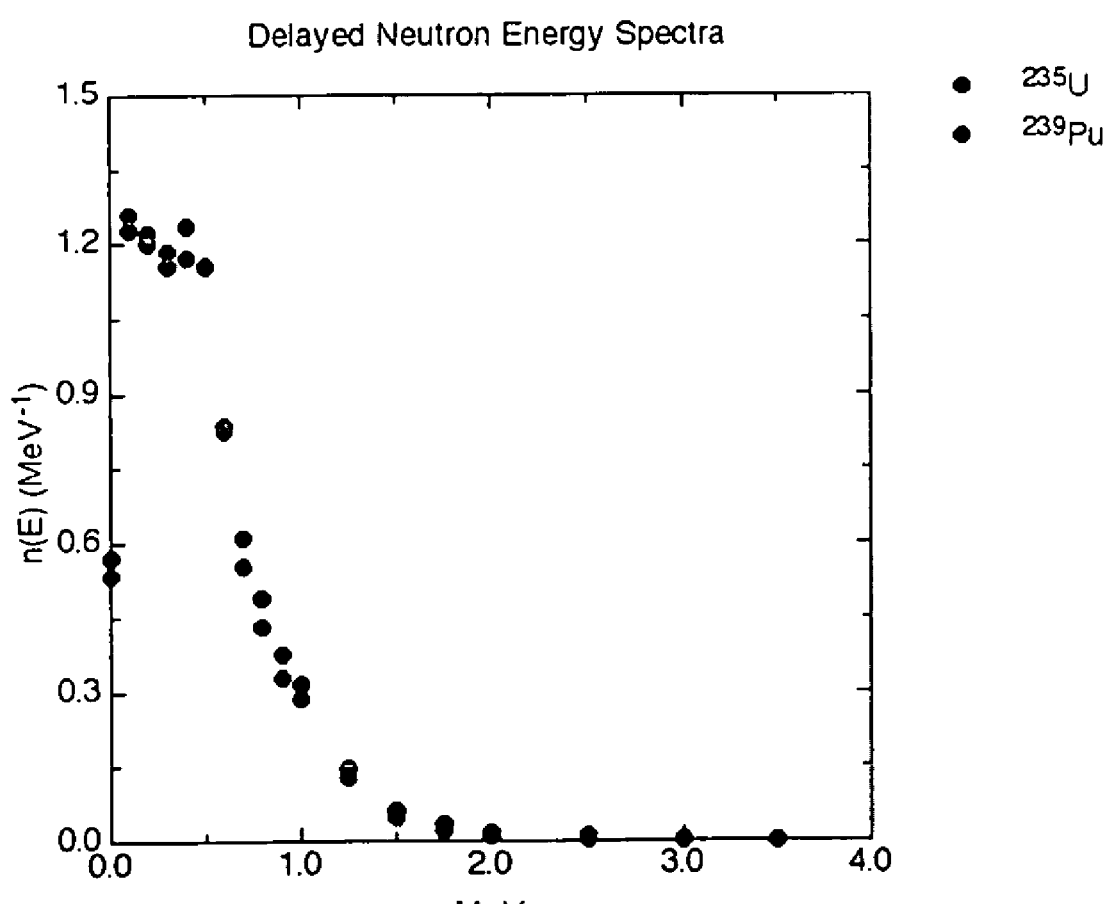
FIG. 1 is a graph of delayed neutron energy spectra for thermal fission of $^{235}$U and $^{239}$Pu from the ENDFB-VI nuclear data set.

The embodiments of the present invention are directed to methods and systems that use either neutrons or high-energy photons (e.g., X-rays or gamma-rays) to irradiate a fully loaded cargo or other container. Such neutrons, X-rays or gamma-rays have a sufficient flux and energy level to induce fission in any SNM inside the container. After the neutron or photon irradiation is completed, a detector, or an array or arrays of detectors are used to interrogate the container for high energy (e.g., above 3 MeV) gamma rays that are produced by radioactive decays of fission products.

The inventors herein have shown that the yields of high-energy gamma rays following the thermal neutron-induced fission of $^{235}$U and $^{239}$Pu are large enough to permit the detection of kilogram-sized quantities of SNM hidden inside of cargo or other containers. The inventors herein have also shown that the energy spectrum of gamma rays emitted by fission products is qualitatively different from that produced by other material that would be commonly found in cargo or other containers. In addition, the inventors herein have determined the effective half-life of these gamma rays to be approximately 20 seconds. However, it should be realized that the effective half-life depends upon the length or duration of irradiation and the start time and the counting interval. Accordingly, the 20 second half-life is an example of a half-life on the order of some tens of seconds depending upon the actual irradiation and counting conditions chosen. The energy spectrum and/or the time dependence (i.e., half-life) and/or the combination of the energy spectrum and the time dependence of the gamma-ray spectrum provide a unique signature for the SNM and its detection. The embodiments of the method and system of the present invention enable a fully loaded cargo container to be screened for SNM in a period on the order of one minute or less. Furthermore, the embodiments of the method and system of the present invention are easily scalable to enable the screening of smaller sized packages such as luggage items at airports for SNM in a period on the order of one minute or less. This ability of the embodiments of the present invention to detect the presence of SNM in suspect containers is quite remarkable considering that such containers come in an enormous range of sizes and loadings. For example, such containers are closed and randomly loaded where one may be unaware whether the contents are apricots, bubble gum, bombs, fabrics, metals, plastics, steel, SNM, or wood. However, it should be realized that bills of lading are likely to be present in some cases and one may have information from radiographs on the contents. So, it is likely that in some cases the contents of a container may not be known and suspect containers may be filled with any of the wide range of cargos common to international commerce.

In particular, the embodiments of the present invention use the high-energy gamma rays emitted from short-lived fission fragments to identify SNM in cargo containers and other potential sites. As used herein high-energy gamma rays refer to gamma rays having an energy level higher than approximately 3-4 million electron volts (MeV), or those having an energy level higher than approximately 2-2.5 MeV. Also as used herein, short-lived fission fragments refer to fission fragments having a half that is less than approximately one minute.

The active interrogation of a mass of highly enriched uranium ("HEU"), Pu, or SNM, embedded in a cargo container, with either 2.5 MeV deuterium-deuterium ("D-D") neutrons or 14 MeV deuterium-tritium ("D-T") neutrons, has been studied by some. A cargo container as used herein, refer to standard containers that are commonly made of steel that are typically available in the 20-foot or 40-foot lengths and which are approximately 8-foot wide by 8.5-foot high, that are used to transport goods on cargo ships. Some containers are larger and some are smaller. In those studies, a reasonable worst-case scenario assumes that the cargo container is otherwise filled with hydrogenous material at a water-equivalent density of about 0.4 gm cm$^{-3}$. As an example of the effectiveness of the embodiments of the present invention, this worse-case scenario has been considered here with the further constraint that the SNM is located at the center of the container and that a distance of 1.5 m must be penetrated before radiations can reach a detector.

It is known that some effort has been expended to investigate the possible use of delayed neutrons as the signal carrier for the presence of SNM. To demonstrate the advantages of the embodiments of the present invention, an evaluation of the relative merits of signals from delayed neutrons and the high-energy gamma rays from short-lived fission products is presented below. This evaluation shows the effectiveness of the embodiments of the present invention for the worst-case scenario, and clearly demonstrates that high-energy gamma rays from the decay of fission products offer a significant advantage in comparison to the signals from delayed neutrons.

Delayed Neutrons

The yields of delayed neutrons from thermal fission of $^{235}$U and $^{239}$Pu are about 0.017 and 0.0065 per fission, respectively. The half lives of the delayed neutron precursors lie in the range of about 0.1-56 s, and the ENDFB-IV nuclear data set energy spectra are shown in FIG. 1. The data on the yield of delayed neutrons shows that approximately half of the intensity has an energy less than 0.6 MeV and there are very few neutrons with energies above about 1.5 MeV.

Because of thermalization and capture of the neutrons in hydrogen, there may be a very small probability for escape of delayed neutrons to an external detector. The results of calculations using nuclear engineering texts show that the root mean squared distance from birth of a 2 MeV neutron at the target until its absorption in hydrogen is about 15 cm in water at normal density, and thus the effective distance that must be traversed through normal water from the target to the detector is approximately 60 cm.

The probability for escape of neutrons to a detector can be approximately estimated in two ways. Beyond about 40 cm from a point source of fission neutrons in water, the flux of neutrons with energies $E_n>1$ MeV is approximately $$G(r) = \frac{0.12e^{-0.103r_w}}{4\pi r^2} \text{cm}^{-2}(\text{source particle})^{-1},$$

where $r_w$ is the distance penetrated in water at normal density. The quantity $4\pi r^2 G(r)$, representing the probability of survival per source particle independent of the $1/\pi^2$ flux loss that will affect all radiations emitted from the source, is found to be about $2.5\times10^{-4}$ (source particle)$^{-1}$. Because the average thermal neutron will be captured in hydrogen within a few cm of where it is produced, this is a measure of the probability that any fission neutron will produce a thermal neutron that escapes to a detector.

A second estimate is obtained from the Fermi-age approximation. This gives the spatial distribution of the neutron density of a given energy that has slowed down from some source energy as $$q(r, \tau) = \frac{e^{-r^2/4\tau}}{(4\pi\tau)^{3/2}} \text{cm}^{-3}(\text{source particle})^{-1},$$

where $\tau$ is the Fermi age in cm$^2$. The approximate value of $\tau$ for thermal neutrons slowing down from a fission source is 31 cm$^2$ in water. Estimating the velocity of a thermal neutron as 2200 m s$^{-1}$, the quantity $4\pi r^2$ q(r,$\tau$) v is about $2.0\times10^{-6}$ (source particle)$^-$.

Although both estimates are rather rough approximations, they clearly indicate a very low probability of a fission neutron producing a thermal neutron that can escape to a detector. Because of their smaller average energies, the attenuation of delayed neutrons is expected to be significantly larger than for fission neutrons and thus the probability that they can produce a thermal neutron that can escape to a detector is expected to be smaller yet. The conclusion is that the direct observation of delayed neutrons under the assumed limiting conditions will likely afford a very low sensitivity for detecting SNM.

On the other hand, indirect observation of the delayed neutrons is possible via their capture by hydrogen ("H") to produce 2.2 MeV gamma rays (or by capture by other nuclides in more realistic situations). The attenuation coefficient for 2 MeV gamma rays in water is about 0.049 cm$^{-1}$. Neglecting the size of the target and the $1/r^2$ flux loss, the probability for escape of such photons to a detector uncollided would be about 0.053. So, in effect, the direct or indirect observation of delayed neutrons under the assumed limiting conditions will likely afford a very low sensitivity for detecting SNM. However, it should be realized that delayed neutrons, under the conditions assumed in the calculations, will not provide a strong signal at the detectors outside the container. But the capture gamma rays may be much more intense. However, a problem with seeing them is that it will be difficult to distinguish them from capture gamma rays from capture of neutrons from the interrogating source. And these could be present in overwhelming abundance in many cases. Further, one would require the use of high-resolution and rather very expensive detectors to identify specific gamma ray lines. This would likely be an impediment to the implementation of such a screening system even if the other aspects of the method were viable.

Considering that delayed neutrons afford a very low sensitivity for detecting SNM in cargo or other containers containing thick hydrogenous cargos, the inventors herein have focused their efforts on the detection of gamma rays from short-lived fission products. The inventors herein have demonstrated that gamma rays from short-lived fission products escape to a detector with significantly higher probability than the delayed neutrons or the capture gamma rays that result from them.

Delayed Gamma Rays from Short-Lived Fission Products

It is known that approximately 90% of the total yield of fission products from thermal fission of $^{235}$U is contained in 32 mass chains located at A=88-103 and A=131-146. For thermal fission of $^{239}$Pu, the light-massed peak increases in mass number by about 8-10 but the heavy massed peak remains fixed. Because the charge distribution is so narrow (FWHM~1.4e) of the chain yield will be found in one or two nuclides. A nuclide produced with Z=$Z_p$, where $Z_p$ is the most probable atomic number for a given mass number, has a yield of about 0.5 of the chain yield. The values of $Z_p$ for $^{239}$PU fission are 0.2-0.3 e greater than for $^{235}$U fission and thus essentially the same nuclides are considered for a fixed mass number in the two cases.

For orientation purposes, only those nuclides with half lives less than a few minutes, and for which the probability for emission of a gamma ray with $E_\gamma>4.0$ MeV is at least $10^{-2}$ per decay, are directly considered. In Table 1 are the nuclides of interest and their relevant properties.

TABLE 1

Short-lived, high-yield fission products with probability > 0.01 for emission of γ-rays with $E_\gamma$ > 4.0 MeV

| Nuclide | Half-Life (s) | $E_\gamma$ (keV) | $I_\gamma$ (%) | $^{235}$U* CY (%) | $^{239}$Pu* CY (%) | $^{235}$U $I_\gamma$ f$^{-1}$ (%) | $^{239}$Pu $I_\gamma$ f$^{-1}$ (%) |
|---|---|---|---|---|---|---|---|
| Br-86 | 55.1 | | | 1.6 | 0.489 | | |
| | | 5407 | 4.6 | | | 0.000736 | 0.000225 |
| | | 5519 | 2.8 | | | 0.000448 | 0.000137 |
| | | 6211 | 0.58 | | | 0.0000928 | 2.84E−05 |
| Br-87 | 55.6 | | | 2.03 | 0.69 | | |
| | | 4181 | 4 | | | 0.000812 | 0.000276 |
| | | 4645 | 2.2 | | | 0.0004466 | 0.000152 |
| | | 4784 | 1.8 | | | 0.0003654 | 0.000124 |
| | | 4962 | 2 | | | 0.000406 | 0.000138 |
| | | 5195 | 0.53 | | | 0.00010759 | 3.66E−05 |
| | | 5201 | 0.55 | | | 0.00011165 | 3.8E−05 |
| | | 5474 | 0.38 | | | 0.00007714 | 2.62E−05 |

TABLE 1-continued

Short-lived, high-yield fission products with probability > 0.01 for emission of γ-rays with $E_\gamma > 4.0$ MeV

| Nuclide | Half-Life (s) | $E_\gamma$ (keV) | $I_\gamma$ (%) | $^{235}U^*$ CY (%) | $^{239}Pu^*$ CY (%) | $^{235}U$ $I_\gamma$ $f^{-1}$ (%) | $^{239}Pu$ $I_\gamma$ $f^{-1}$ (%) |
|---|---|---|---|---|---|---|---|
| Br-88 | 16.3 | | | 1.78 | 0.51 | | |
| | | 4022 | 1.51 | | | 0.00026878 | 7.7E−05 |
| | | 4148 | 4 | | | 0.000712 | 0.000204 |
| | | 4495 | 1.2 | | | 0.0002136 | 6.12E−05 |
| | | 4563 | 3.2 | | | 0.0005696 | 0.000163 |
| | | 4722 | 1.76 | | | 0.00031328 | 8.98E−05 |
| | | 4986 | 1.95 | | | 0.0003471 | 9.95E−05 |
| | | 5020 | 1.51 | | | 0.00026878 | 7.7E−05 |
| | | 5197 | 0.95 | | | 0.0001691 | 4.85E−05 |
| | | 5212 | 0.64 | | | 0.00011392 | 3.26E−05 |
| | | 5296 | 0.72 | | | 0.00012816 | 3.67E−05 |
| | | 5456 | 0.64 | | | 0.00011392 | 3.26E−05 |
| Br-89 | 4.35 | | | 1.09 | 0.35 | | |
| | | 4086 | 1.8 | | | 0.0001962 | 0.000063 |
| | | 4166 | 3.8 | | | 0.0004142 | 0.000133 |
| | | 4354 | 1.2 | | | 0.0001308 | 0.000042 |
| | | 4502 | 0.88 | | | 0.00009592 | 3.08E−05 |
| Rb-90 | 158 | | | 4.5 | 1.28 | | |
| | | 4136 | 6.7 | | | 0.003015 | 0.000858 |
| | | 4366 | 8 | | | 0.0036 | 0.001024 |
| | | 4646 | 2.25 | | | 0.0010125 | 0.000288 |
| | | 5187 | 1.17 | | | 0.0005265 | 0.00015 |
| Rb-90m | 258 | | | 1.24 | 0.742 | | |
| | | 4193 | 1.14 | | | 0.00014136 | 8.46E−05 |
| | | 4454 | 1.18 | | | 0.00014632 | 8.76E−05 |
| Rb-91 | 58.4 | | | 5.58 | 2.1 | | |
| | | 4078 | 4.1 | | | 0.0022878 | 0.000861 |
| | | 4265 | 1.4 | | | 0.0007812 | 0.000294 |
| Rb-92 | 4.5 | | | 4.82 | 1.92 | | |
| | | 4638 | 2.2 | | | 0.0010604 | 0.000422 |
| | | 4809 | 1.1 | | | 0.0005302 | 0.000211 |
| | | 4836 | 1 | | | 0.000482 | 0.000192 |
| | | 4923 | 1.1 | | | 0.0005302 | 0.000211 |
| | | 5188 | 2.5 | | | 0.001205 | 0.00048 |
| | | 5215 | 1.1 | | | 0.0005302 | 0.000211 |
| | | 5249 | 1.1 | | | 0.0005302 | 0.000211 |
| | | 5584 | 1.7 | | | 0.0008194 | 0.000326 |
| | | 5632 | 2 | | | 0.000964 | 0.000384 |
| | | 5739 | 0.7 | | | 0.0003374 | 0.000134 |
| | | 5879 | 0.7 | | | 0.0003374 | 0.000134 |
| | | 5901 | 0.9 | | | 0.0004338 | 0.000173 |
| | | 6004 | 0.59 | | | 0.00028438 | 0.000113 |
| | | 6030 | 0.79 | | | 0.00038078 | 0.000152 |
| | | 6115 | 0.8 | | | 0.0003856 | 0.000154 |
| Sr-95 | 23.9 | | | 5.27 | 3.01 | | |
| | | 4075 | 1.22 | | | 0.000643 | 0.000367 |
| Y-98 | 0.55 | | | 1.92 | 1.52 | | |
| | | 4450 | 8.9 | | | 0.00171 | 0.001353 |
| I-136m | 46.9 | | | 1.26 | 1.65 | | |
| | | 4560 | 1.41 | | | 0.00017766 | 0.000233 |
| | | 4889 | 2.2 | | | 0.0002772 | 0.000363 |
| | | 5091 | 0.54 | | | 0.00006804 | 8.91E−05 |
| | | 5187 | 1.04 | | | 0.00013104 | 0.000172 |
| | | 5255 | 0.58 | | | 0.00007308 | 9.57E−05 |
| | | | Totals | 31.0 | 14.3 | 0.03106 | 0.0122 |

The fifth and sixth columns of Table 1 provide cumulative yields of the nuclides, and the seventh and eight columns provide the absolute intensity of gamma rays per fission.

As is shown above, eleven nuclides are listed in the table with half lives in the range 0.55-158 s. All but one have half lives in essentially the same range as the delayed neutrons. For most of the nuclides, the cumulative yield is significantly larger than the independent yield and that implies that an additional ten or so nuclides with comparable or shorter half lives might have significant probabilities for emission of high-energy gamma rays. The total of the cumulative yields of the eleven nuclides is approximately twice as large for fission of $^{235}$U as it is for $^{239}$Pu. The total probability per fission for observing a gamma ray with $E_\gamma > 4.0$ MeV from decay of these nuclides is about 0.031 and 0.012, respectively, for the two fission systems. These are about a factor of two larger than the delayed neutron yields and represent conservative estimates.

The attenuation coefficient for 4 MeV gamma rays in $H_2O$ is 0.034 cm$^{-1}$, and thus 13% of such gamma rays would escape from the container (e.g., 1.5 m distance) uncollided as compared to about 5.3% for 2 MeV gamma rays. If the 2.2 MeV photons from neutron capture on hydrogen were used as a surrogates for delayed neutrons, the high-energy gamma rays from the fission products offer, conservatively, a factor of about 5 larger probability for escape to a detector. While the capture photons are monoenergetic, the fission product gamma rays vary considerably in energy. Unless one used a high-resolution instrument, such as a germanium ("Ge") detector, one will not be able to resolve these lines but one would also be unlikely to distinguish the capture photons either. Thus, what one is looking for is an elevated continuum that lasts for a few minutes following the neutron burst.

The use of gamma ray detection for discovering illicit SNM may be limited by both the natural background and by the decay of activation products, especially those with half lives on the order of seconds or minutes. The natural background is dominated by a gamma ray at 1.461 MeV ($^{40}$K) and the highest energy line of high intensity is that at 2.614 MeV ($^{208}$Tl). Apart from very weak lines resulting from neutron capture of the terrestrial neutron background and rare high-energy interactions, no gamma ray lines with energies exceeding 4 MeV are found.

The characteristics of short-lived activation products with lifetimes comparable to the fission products listed in Table 1 are shown in Table 2.

detailed Monte Carlo calculations. Therefore, the intensity enhancement from a D-T target may be maintained without undue production of neutron activation products. Regardless of which neutron source is chosen, the average neutron that can penetrate to the target will be thermal or very nearly so.

In order to detect the presence of SNM using high-energy gammas emitted from fission products, the characteristic energy spectrum and time dependence of these high-energy gammas was measured. In order to do so, it was advantageous to have a switchable high-intensity source of neutrons of variable energy that can be used to irradiate targets of $^{235}$U and/or $^{239}$Pu. The 88" Cyclotron at Lawrence Berkeley National Laboratory ("LBNL") provides such a beam, measurement and shielding facility. At the 88", neutrons were produced in large numbers by deuteron fragmentation. The 88" provided deuteron beams up to 60 MeV with currents up to 10 μA. The neutrons were produced on average with half the deuteron energy and their angular distribution was forward peaked. In this manner, a large number of neutrons were directed onto a suitable moderator and then onto the target of interest. A target delivery and transfer system (e.g., rabbit system) was also used at the LBNL facility that enabled the irradiation of the target inside an existing cave

TABLE 2

Neutron activation products with short half lives

| Act. | Prod. Reaction | $E_\gamma$ (MeV) | Half Life (sec) | $I_\gamma$ (abs) | $I_\gamma$ >2.0 MeV (abs) | Thresh (MeV) | % abund |
|---|---|---|---|---|---|---|---|
| C-15 | 18O(n, a) | 5.3 | 2.4 | 0.63 | | 5.29 | 0.2 |
| N-16 | 16O(n, p) | 6.1 7.1 | 7.1 | 0.67 0.049 | | 10.25 | 99.8 |
| Na-26 | 26Mg(n, p) | 2.52 2.54 | 1.1 | | .070 > 2.0 | 8.86 | 11 |
| Al-30 | 30Si(n, p) | 2.23 2.6 3.5 | 3.6 | | 1.05 > 2.0 | 8.04 | 3.1 |
| K-44 | 44Ca(n, p) | 2.15 2.52 3.66 | 1326 | | >0.4 (>2.0) | 4.99 | 2.09 |
| S-37 | 36Ar(n, γ) 40Ar(n, a) | 3.1 | 300 | 0.94 | | 0 2.56 | 0.34 99.6 |

With the exception of the (n,γ) and (n,α) reactions on the Argon (Ar) isotopes, all of the other reactions have thresholds greater than about 5.0 MeV, and, if D-D neutrons are used as the interrogation source, these reactions will not take place. Ar comprises about 0.93% of air. The (n,α) excitation function on $^{40}$Ar shows a maximum of 0.02 b at an energy of about 8.7 MeV and drops to less than about 0.001 b at 5.0 MeV. Thus, with D-D neutrons, the source produced by this reaction is expected to be very weak. Therefore, in the zeroth order, the (n,γ) cross section on $^{36}$Ar may be neglected because of its low atomic abundance.

If D-T neutrons are used, the production of these interfering nuclides will take place only in that volume where the neutrons have not been moderated enough to drop their energies below about 5 MeV.

While attractive from the point of view of minimizing interference from activation products, the use of D-D neutrons comes with the handicap of a production cross section of about a factor of 100 less than that possible with D-T sources, a deficit that may be too large to incur. However, by using a partially moderated D-T source the fraction of incident neutrons that lies above 5 MeV is substantially reduced. As an example, it may be possible to surround the D-T source with Be of an optimum thickness determined by and then the transfer of the target to a remote shielded counting station where Ge, sodium iodide ("NaI"), or plastic scintillator detectors were located. In addition, appropriate electronics and data acquisition systems necessary for such measurements, were used to make the measurements. However, it should be realized than one embodiment of the present invention, uses thermal neutrons and as such the 88" was used to provide neutrons with relative ease at a large enough intensity to make the required measurements.

Using the system described above, the feasibility of the methodology and system of the embodiments of the present invention was demonstrated by conducting the following exemplary experiment. A deuteron source (e.g., 1 μA of 16-MeV such as the LBNL's 88" Cyclotron) was used to bombard a beryllium ("Be") target to produce source of neutrons. The neutrons were then moderated (i.e., slowed down) using a combination of steel and polyethylene. Highly enriched $^{235}$U, and $^{239}$Pu targets were irradiated with the neutrons and then transported to a shielded counting station using a pneumatic transfer system, as is known to those skilled in the art of nuclide detection. Gamma ray counting was performed with large high purity germanium ("Ge") scintillator and plastic scintillation detectors. Time-based data was acquired using an ORTEC NOMAD system running GAMMAVISION. Using this bombardment and detection setup, many gamma particles above 4 MeV were detected and decay curves as a function of energy were determined. These as well as other aspects of the embodiments of the present invention and how it is generalized for containers in general and cargo containers in particular are described below in further detail.

The measurement methodology disclosed above describes a method that provides unequivocal signatures of $^{235}$U and $^{239}$Pu that provides high sensitivity in the presence of thick hydrogenous and other cargos. The system and method in accordance with the embodiments of the present invention is based in part on the relatively high intensity of γ rays with $E_\gamma \geqq 3.0$ MeV that are emitted from short-lived fission fragments (e.g., see Chu, S. Y. F., Ekstrom, L. P., and Firestone, R. B., *WWW Table of Radioactive Isotopes*, http:ie.lbl.gov/toi (1999), and England, T. R. and Rider, B. F., ENDF-349, LA-UR-94-3106 (1994)). These β-delayed γ rays have yields in fission that are approximately an order of magnitude larger than the corresponding β-delayed neutron intensities from the thermal fission of $^{235}$U and $^{239}$Pu. They are likely to be transmitted through thick hydrogenous material with $10^2$-$10^3$ times the probability likely for β-delayed neutrons. Their energies lie above interferences from normal environmental radioactivity. In addition, the energy spectra and time dependencies for emission of the β-delayed γ rays provide unique signatures for $^{235}$U and $^{239}$Pu.

In order to capture the main properties of the high-energy delayed γ rays, the γ-ray spectra following thermal neutron induced fission of $^{235}$U and $^{239}$Pu was measured. Using the setup and facility described above, neutrons were produced by bombarding a 1-inch thick water-cooled Be target with 16-MeV deuterons from the Lawrence Berkeley National Laboratory's 88-Inch Cyclotron. Neutrons were then moderated using a 15 cm cube of steel surrounded by up to 45 cm of polyethylene. The steel cube was located immediately downstream of the Be target. A pneumatic transfer system shuttled targets between an irradiation location inside the polyethylene and a remote shielded counting station with a transit time of 2-3s. The thermal neutron flux at the irradiation site was approximately $1.5\times10^6$ cm$^{-2}$ s$^{-1}$. $^{235}$U (93% isotopic content), $^{239}$Pu (95% isotopic content) and, as representative of the characteristics of some cargo loadings, wood, polyethylene, aluminum, sandstone, and steel were irradiated. In each case, targets were repeatedly subjected to cycles of 30-s irradiations followed by 30-s counting periods, during which 10 sequential 3.0-s γ-ray spectra were acquired. Counting began 3 s after the end of irradiation. γ-rays were detected with an 80% relative efficiency coaxial high purity Ge ("HPGe") detector and with a 30-cm×30-cm×10-cm plastic scintillator. Data were acquired and sorted using ORTEC PC-based electronics and software.

Figure 2:
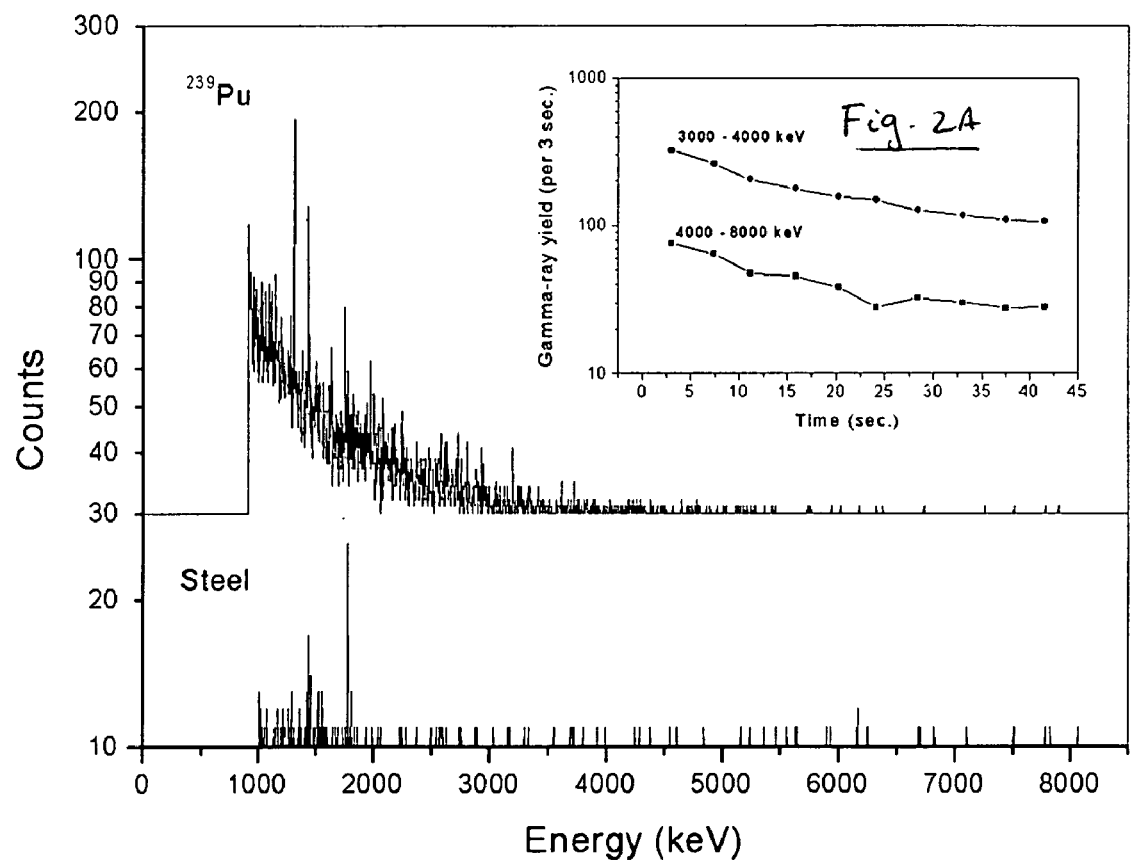
FIG. 2 is a γ-ray spectra observed in the HPGe detector in 30 seconds of live time following the neutron irradiation of 0.568 grams of $^{239}$Pu and of 115 grams of steel. In order to display these two spectra on the same plot, offsets of 30 and 10 counts per channel were added to the data obtained from the $^{239}$Pu and steel targets, respectively.

FIG. 2 is a γ-ray spectra observed in the HPGe detector in 30 seconds of live time following the neutron irradiation of 0.568 grams of $^{239}$Pu and of 115 grams of steel. In order to display these two spectra on the same plot, offsets of 30 and 10 counts per channel were added to the data obtained from the $^{239}$Pu and steel targets, respectively. FIG. 2A (inset) is a graph of background-corrected decay curves for gamma rays in the energy intervals 3000-4000 keV and 4000-8000 keV observed from the $^{239}$Pu target. Similar results were obtained from a $^{235}$U target.

FIG. 2 shows γ-ray spectra for $E \geqq 1.0$ MeV acquired with the HPGe detector from irradiation of 0.568 grams of $^{239}$Pu and 115 grams of steel. The temporal behavior of detected high-energy events is shown in the inset, FIG. 2A. Both the energy and temporal distributions of the high-energy γ rays from thermal fission of $^{235}$U are quite similar to those shown for $^{239}$Pu but their intensity per fission is about a factor of 3 larger. Also, results similar to those shown for steel were found from the irradiation of wood, polyethylene, aluminum and sandstone in the most important characteristic, i.e., no spectrum indicated the presence γ rays with energies exceeding 3.0 MeV. From the steel target, a small number of lower-energy γ rays produced by the decays of long-lived isotopes such as $^{56}$Mn ($t_{1/2}$=2.58 hours) were observed. To the contrary, the spectrum from $^{239}$Pu is indicative of fairly intense γ-ray emission at $E \geqq 3.0$ MeV that extends to at least 5.5-6.0 MeV.

It is also clear, as expected, that the high-energy intensity is spread over a relatively large number of lines rather than concentrated in only a few. Thus, a simple and sensitive method to identify fissile material may integrate the total number of events in a wide energy interval, regardless of whether the events represent full or partial-energy depositions. The results from this type of analysis for the energy intervals 3-4 MeV and 4-8 MeV are shown in FIG. 2A (inset). The integrated numbers of events from irradiated $^{235}$U and $^{239}$Pu showed decays with a short effective half-life of approximately 25 seconds, whereas those from all other materials tested showed much longer decay times. The two features—large numbers of γ rays with energies above 3.0 MeV and a short effective half-life—are unique signatures of $^{235}$U and $^{239}$Pu.

Because of the high-density of γ-ray lines produced by the decay of fission fragments, a practical system for interrogating large objects does not necessarily require high-resolution detectors, such as the above HPGe detector. For example, the energy spectrum shown in FIG. 2 was generated using a high-resolution detector and thus various sharp energy counts are displayed. However, had a low-resolution detector been used, then the overall shape of the spectrum of FIG. 2 would still be the same. In fact, essentially the same results shown in FIG. 2 were obtained with the low-resolution plastic scintillator described above. This is particularly significant because such scintillators are sufficiently low in cost that allow one to form a large array of such devices surrounding a cargo container to provide a large solid angle for detecting photons.

Accordingly, a signal processing method and system in accordance with the embodiments of the present invention compares a detector signal against a threshold level comprising an energy level and/or a measure of the time-dependence (e.g., a half-life level), or both an energy level and a half-life level threshold to form a comparison and then detects the presence of the SNM in a container using the results of the comparison. This signal processing system detects the presence when the detected signal's energy is higher than an energy threshold level, or when the half-life signal is shorter than a threshold level, or when both the energy level is higher than a threshold and when the half-life signal is shorter than a threshold level.

Figure 3:
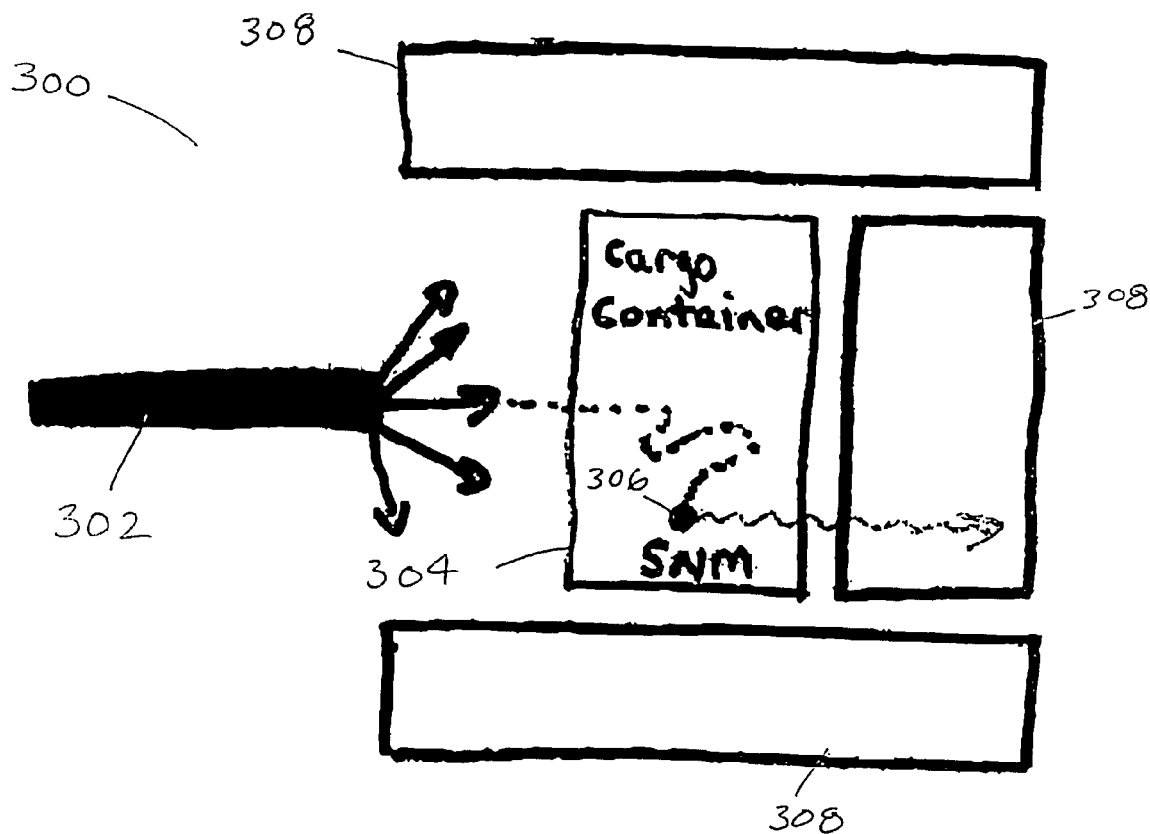
FIG. 3 is an exemplary schematic diagram of one embodiment of the detection system in accordance with the present invention.

To demonstrate that a system and method as described above is easily scalable, even all the way up to a large container, and thus able to yield practical results in reasonable times, the response of an array of detectors following a 30-s irradiation of a cargo container with a source producing $10^{11}$ 14 MeV neutrons s$^{-1}$ is estimated as follows. As a worse-case scenario, in the full-scale system, the cargo is assumed to be wood with a 5-cm (diameter) sphere of $^{239}$Pu located at its center. An embodiment of such a fill-scale system 300 is shown in FIG. 3. FIG. 3 shows neutron beam source 302 directing neutrons at a cargo container 304 that is suspected of containing SNM 306. Any beam generating system that is capable of providing such a flux (e.g., a flux capable of causing fission in the SNM target) may be used with the system of the present invention. Such a flux may be a thermal or other neutron flux or alternately an equivalent photon flux adjusted for energy and intensity according to the reaction cross section. For example, a compact linear accelerator, such as a LINAC and an appropriate target (e.g., Be) may be configured to provide the necessary flux. In one embodiment, the beam emits neutrons isotropically so as to adequately scan the container. Alternately, the beam may be an anisotropic beam that is scanned across the container using a scanning system. Or yet, the beam may be a narrow beam used with the container that is moved through fixed detectors so that a portion of the container is irradiated at a given time. The neutron beam may be a D-D or a D-T produced beam. The cargo container 304 is surrounded by an array of detectors 308 that are used to detect high-energy gammas that are emitted from fission products produced by the thermal fission of the SNM nuclei by the neutrons that have been moderated on their way to the SNM target 306. The detector or detectors, or array of detectors may be Ge or HPGe detectors or liquid or plastic scintillators, or other suitable gamma ray detectors. In one embodiment, the cargo container 304 is moved on a rail car in position relative to the beam source 302 and the detectors 308. The cargo is then irradiated for a time period (e.g., 30 sec.) and then after the irradiation, counting is conducted for another time period (e.g., 30 sec.). Alternately, the cargo container 304 is placed on a moving conveyor and it is irradiated and counted in a continually moving configuration. The counting period is not limited to a 30-second period, so long as the period is capable of adequately capturing gamma rays having a half-life on the order of 20 to 30 seconds. As set forth above, the effective half-life depends upon the length or duration of irradiation and the start time and the counting interval. Accordingly, the 20 second half-life is an example of a half-life on the order of some tens of seconds depending upon the actual irradiation and counting conditions chosen.

Figure 4:
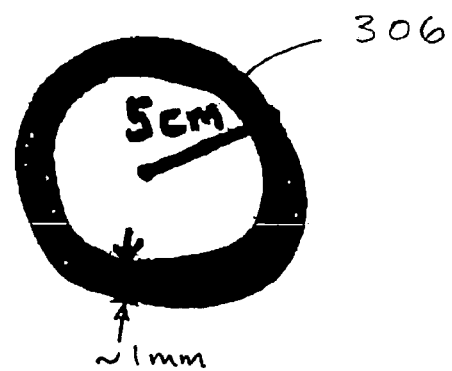
FIG. 4 is a schematic diagram of an exemplary SNM target in accordance with the embodiments of the present invention.

For a worse-case determination, the $10^{11}$ 14 MeV neutrons $s^{-1}$ beam is considered to be approximately 15 feet away from the container 304. With no attenuation, the neutron flux at a distance of approximately 15 feet will be approximately $3.8 \times 10^4$ neutrons/cm$^2$-sec (e.g. $1/r^2$ attenuation). Based on a very conservative estimate that 90% of all neutrons are absorbed by other cargo, then the resulting flux at the SNM target will be approximately $3.8 \times 10^3$ neutrons/cm$^2$-sec. Integrated over a 30-second irradiation window, the resulting neutron fluence is approximately $1.1 \times 10^5$ n/cm$^2$. Referring to FIG. 4, and considering that a thermal neutron has an attenuation length in $^{235}$U or $^{239}$Pu of on the order of 1 mm, then the available target mass for a 5 cm diameter target is approximately 500 grams. Using conservative text book calculations, the resulting gamma yield of gamma rays above 3 MeV that are emitted in a 30 second window is approximately $1.0 \times 10^5$. Again using a very conservative estimate and estimating that approximately 10% of the high-energy gammas escape the container, then it is estimated that approximately 1000 high-energy gamma events are expected to be detected in a 30-second counting window following the thermal fission of $^{239}$Pu, and approximately 350 detected γ-ray events above 3 MeV for $^{235}$U.

These very conservative scaling calculations show that with currently available technology, an entire cargo container may be scanned for $^{235}$U and $^{239}$Pu and other SNM in approximately less than one minute. Possible interferences from activities induced in other materials are few and can be negated substantially by appropriate choice of the interrogating source, as is known to those of skill in the detection of radionuclides. Furthermore, the system in accordance with the embodiments of the present invention, when combined with a radiographic imaging system, is even more attractive for rapid identification of $^{235}$U and $^{239}$Pu and other fissile materials in a wide range of applications.

While the above disclosure has focused on the detection of high-energy γ rays produced by the decay of fission fragments of SNM and especially those that have been produced as a result of the thermal neutron induced fission of a portion of the SNM, the embodiments of the present invention are not limited solely to the detection of high-energy γ rays that are produced solely by the decay of thermal neutron induced fission fragments.

For example, to induce a nuclear fission and hence produce fission fragments that in turn decay by emitting high-energy γ rays, it is known that one must add a sufficient amount of energy to the heavy nucleus (e.g., of the SNM) to overcome the nuclear fission barrier. This can be done in a variety of ways. One could cause a heavy nucleus, such as the nucleus of the SNM, to capture a thermal or a higher energy neutron. In that case, the binding energy of the added neutron itself is sufficient to overcome the fission barrier and induce fission, as has been described above.

An alternative embodiment of the present invention directs a beam of energetic particles, i.e., with kinetic energy greater than the fission barrier at the nucleus of the SNM to induce fission. An example of such a reaction is photofission, in which a high-energy gamma ray strikes a heavy nucleus, for example the nucleus of the SNM, thereby inducing fission and the resulting fission products, the decays of which are accompanied by the emission of high-energy γ rays, which are detected using the methods and systems described above. For the purpose of the embodiments of the present invention any high-energy gamma ray source that is capable of delivering a kinetic energy greater than the fission barrier at the nucleus of the SNM to induce fission may be used. Such gamma ray sources are known to those skilled in the art. For example, a beam having an energy in the range approximately 10-30 MeV or higher resulting in a sufficient amount of energy being added to the heavy nucleus to overcome the fission barrier may be used. As used herein, the sufficient energy is in the range of approximately 4-7 MeV, which represents a range for the critical energy for fission of certain nuclei.

As will be understood by those skilled in the art, the present invention may be embodied in other specific forms without departing from the essential characteristics thereof. For example, fission of a portion of the SNM may be induced by thermal or higher energy neutrons or by high-energy photons or high-energy gamma ray. The source of neutrons may be any source including a D-D or a D-T source that gets moderated on its way to the SNM target to induce fission in a portion of the SNM. Or that the detectors and their signal processing software and devices may be any setup that is capable of obtaining a time-dependant energy spectrum for the high-energy gamma rays that have been emitted from the fission products of the fission of a portion of the SNM. These other embodiments are intended to be included within the scope of the present invention, which is set forth in the following claims.

What is claimed is:

1. A method of interrogating a container, comprising the steps of:
   a) irradiating the container for approximately 30 seconds with neutrons having energies between about 2.45 and 14 MeV or with a gamma ray beam having an energy of at least 10 MeV;
   b) stopping the irradiating;
   c) after stopping the irradiating, counting β-delayed gamma rays having an energy range between about 3 and 6 MeV for approximately 30 seconds;
   d) making a first plot comprising number of β-delayed gamma rays counted in step c as a function of β-delayed gamma ray energy to produce an observed energy spectrum;
   e) making a second plot of the total number of β-delayed gamma rays counted in a portion of the energy range between about 3 and 4 MeV as a function of time in order to determine an effective half-life;
   f) comparing the observed energy spectrum with known energy spectra produced by fission products of U-235; and
   g) concluding that there is U-235 in the container when:
      the observed energy spectrum and the known energy spectra have the same overall shape; and
      the observed effective half-life is approximately 20 to 30 seconds.

2. The method of claim 1 wherein, in step g, the observed energy spectrum and the known energy spectra having the same overall shape comprises having the same overall shape wherein the number of β-delayed gamma rays decreases as the energy increases at energies greater than approximately 3 MeV.

3. The method of claim 1 wherein the neutrons comprise D-D neutrons.

4. The method of claim 1 wherein the neutrons comprise D-T neutrons.

5. The method of claim 1 wherein a plastic or liquid scintillation detector is used for the counting step.

6. The method of claim 1 wherein:
   the container has dimensions of approximately 8 feet by 40 feet by 8.5 feet and is made of steel;
   the container holds at least 500 grams of U-235;
   the neutrons have an energy of approximately 14 MeV;
   the neutrons have a flux of approximately $3.8 \times 10^4$ neutrons/cm$^2$ sec at a distance of approximately 15 feet from the container;
   detectors surrounding the container on at least three sides are used for the counting; and
   at least 350 β-delayed gamma rays with energies above 3 MeV are counted.

* * * * *